United States Patent [19]

Zapata

[11] Patent Number: 4,876,797

[45] Date of Patent: Oct. 31, 1989

[54] REDUCED VIBRATION PORTABLE GAS OPERATED HAND SAW

[76] Inventor: Alvaro Zapata, 7511 Maldive St., Rio Linda, Calif. 95673

[21] Appl. No.: 297,029

[22] Filed: Jan. 17, 1989

[51] Int. Cl.$^4$ .................. B23D 45/16; B25F 3/00; B26B 11/00

[52] U.S. Cl. ..................................... 30/388; 30/122; 30/500

[58] Field of Search ............... 30/180, 122, 382, 388, 30/389, 390, 391, 500

[56] References Cited

U.S. PATENT DOCUMENTS

| | | | |
|---|---|---|---|
| 2,694,457 | 12/1954 | Lawrence | 30/388 |
| 4,140,209 | 2/1979 | Muller | 30/122 |
| 4,620,367 | 11/1986 | Tubesing et al. | 30/122 |
| 4,807,727 | 2/1989 | Paulik | 56/306 |
| 4,809,438 | 3/1989 | Nagashima et al. | 30/122 |

Primary Examiner—Frank T. Yost
Assistant Examiner—Paul M. Heyrana, Sr.
Attorney, Agent, or Firm—Mark C. Jacobs

[57] ABSTRACT

A portable self-contained gas operated hand saw is provided having a housing with a carburetor an engine therein, a handle having a trigger coupled to the carburetor mounted at one end of the housing and a saw blade mounted at the other end of the housing. The saw blade housing has a worm gear driven rotatable shaft to which a saw blade may be keyed for rotation. The worm gear is driven by a centrifugal clutch driven by the engine. Fans are provided for rotation with the clutch and saw blade for cooling the saw in addition to the normal cooling of the engine. Anti-vibration means are provided to isolate the handle and trigger from the engine. The engine is suspended from a rubber mount allowing it to vibrate freely, thereby isolating vibration from the saw blade housing, saw plate, and handle and trigger.

16 Claims, 7 Drawing Sheets

REDUCED VIBRATION PORTABLE GAS OPERATED HAND SAW

BACKGROUND OF THE INVENTION

1. Field of the Invention

The invention relates to portable saws; and, more particularly, to an improved totally self contained portable gas operated hand saw having vibration isolation.

2. Description of the Prior Art

Portable saws are well known in the art. The majority of these saws are electrically operated having inconvenient electrical cords which can be cut during use causing injury to the operator. Such saws cannot be operated safely in inclement weather or under wet conditions and are not truly portable since a source of electricity is required.

Gas driven portable saws have been suggested in the past. For example, U.S. Pat. Nos. 3,513,888 to Townsend et al and 4,302,880 to Elfving et al describe gas operated saws. However, none of these prior art devices show a totally self contained portable gas operated hand saw having an isolated suspended engine and saw blade driving means which make such a saw commercially feasible. One reason for the failure of these to be commercially accepted is the fact that the vibration level is so high that single hand cuts cannot accurately be made. Attempts to overcome this problem by reducing the engine size has resulted in cuts not suitable for commercial endeavors. The invention herein permits "large" engines to be used, while maintaining a low vibration level.

SUMMARY OF THE INVENTION

It is an object of this invention to provide an improved totally self contained portable gas operated hand saw.

It is another object of this invention to provide such saw having a worm gear driven saw blade and a centrifugal clutch between the worm gear and the saw engine.

It is still further an object of this invention to provide such a saw having dual built in cooling means and engine isolation to enable one handed cuts to be made accurately.

Yet another object is to provide anti-vibration means to enable the saw to employ a relatively large commercial engine.

These and other object are preferably accomplished by providing a portable self contained gas operated hand saw having a housing with a carburetor and an engine therein, a handle having a trigger coupled to the carburetor mounted at one end of the housing and isolated from the engine, and a saw blade housing for receiving a saw blade mounted at the other end of the housing. The saw blade housing has a worm gear driven rotatable shaft to which a saw blade may be keyed for rotation. The worm gear is driven by a centrifugal clutch driven by the engine which engine is isolated and suspended to reduce vibration to the handle and other parts. Fans are associated with the shaft and the clutch for providing added cooling. In this manner, a totally portable improved hand saw having no electrical cords or the like is provided and which is relatively vibration free.

DESCRIPTION OF THE PREFERRED EMBODIMENT

Figure 1:
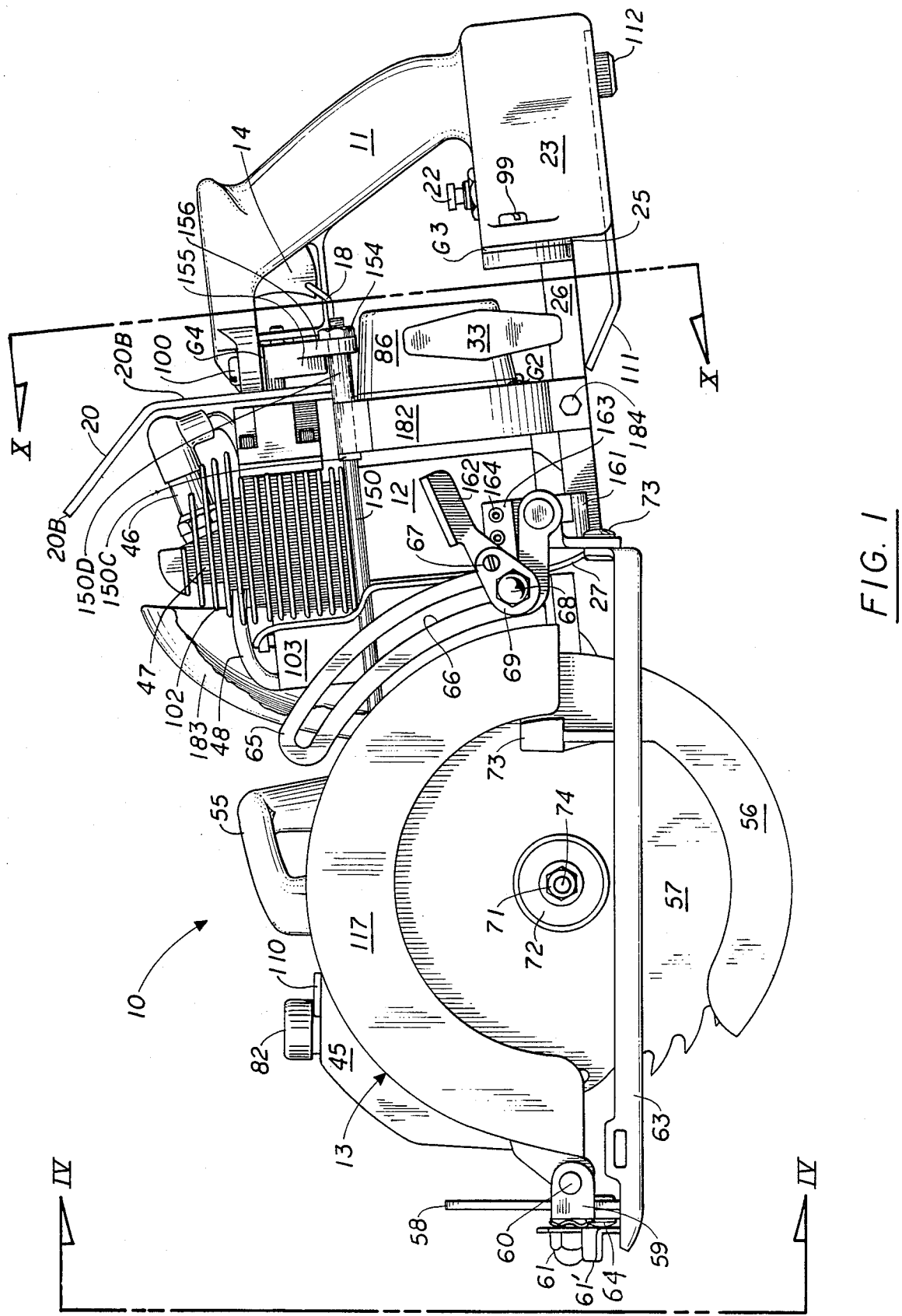
FIG. 1 is a vertical view, of an improved portable hand saw in accordance with the invention.
Figure 8:
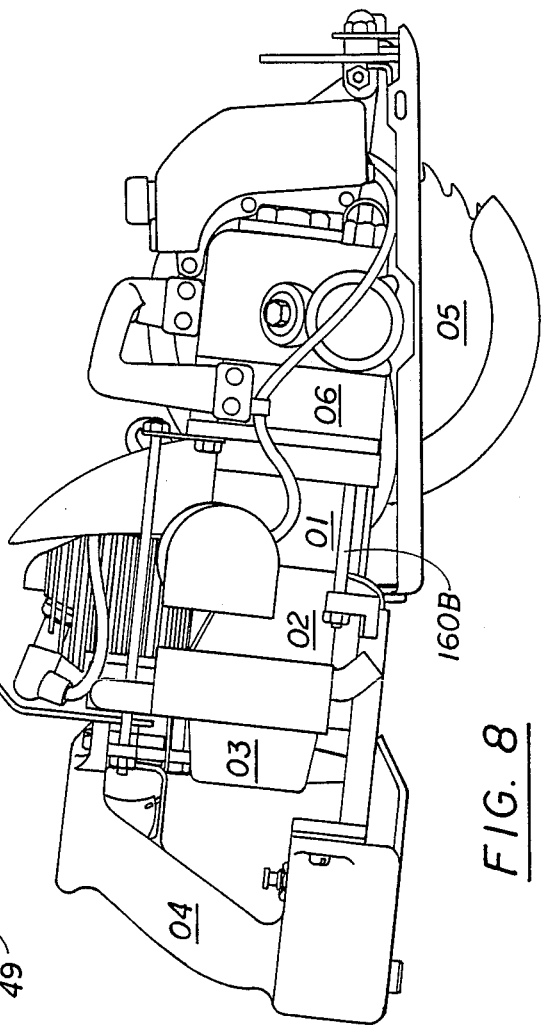
FIG. 8 is a simplified view to illustrate the major components of the invention.

Prior to referring to FIGS. 1 et seq for details of the instant invention, the reader is urged to note FIG. 8, which is a somewhat simplified view showing the major components to be discussed. For the sake of brevity some details have been omitted in FIG. 8. Thus section 06 is the clutch housing that connects the saw to the main housing 01. Section 02 is the engine, section 03 is the pull starter, while section 04 is the handle, and of course 05 is the blade of the saw.

Referring now to FIG. 1 of the drawing, a portable saw 10 in accordance with the invention is shown. Saw 10 includes a pistol-shaped handgrip 11 coupled to a main engine housing 12 having attached thereto at its forward end a saw housing 13. Handgrip 11 includes a trigger 14 pivotally mounted in handgrip 11 by a pivot pin 15. (See FIG. 3.) A cavity 16 is provided in trigger 14 with an optional, but preferable coil spring 17 mounted therein for normally biasing trigger 14 best seen in FIG. 3, An actuating rod 18 is fixedly secured to trigger 14 and extends therefrom to a pivot mechanism 36 on starter housing 86. (FIG. 2) As is seen, heat shield 20, (to prevent heat transfer), is interposed between the rear of engine 12 and the handle 11. This heat shield 20 is seen in FIG. 3 to be secured by screws 20' into suitable bores in cross member 155 and allowing air gap to exist between exhaust 104 and shield 20. Note FIG. 2. Of course this securing procedure could be accomplished in any suitable manner, such as gluing. Shield 20 may extend beyond the confines of the engine housing 12 as is illustrated. Shield 20 includes a vertical section 20A, and a distal forwardly canted section 20B. Shield 20 may be shaped to further surround fluted housing 102 to prevent accidental burns during handling.

A conventional push button switch 22 is mounted on the lower portion 23 of handgrip 11 or at other suitable location via nut 24. A gasket 25 may be provided between lower portion 23 of grip 11 and an extension portion 26 thereof. An insulated electric wire conduit 27 leads from electronic ignition coil 103 to a connection at 28 of push button switch 22 through groove under extension portion 26. A second electrical conduit 30 leads to ground at the extension portion 26. As seen in FIG. 1, the handgrip 11 may be removably secured to the extension portion 26 via screws 99 at bottom and at the top to the cross-member 155 via screws 100. A gasket 25 may be provided between handgrip 11 and extension portion 26 as shown. Handle 11 is secured at its forward end to cross member 155 and extension 26 by bolts 100A & 100B, -per FIG. 1, a left side elevational view,- on both the left and right sides of saw 10.

Figure 2:
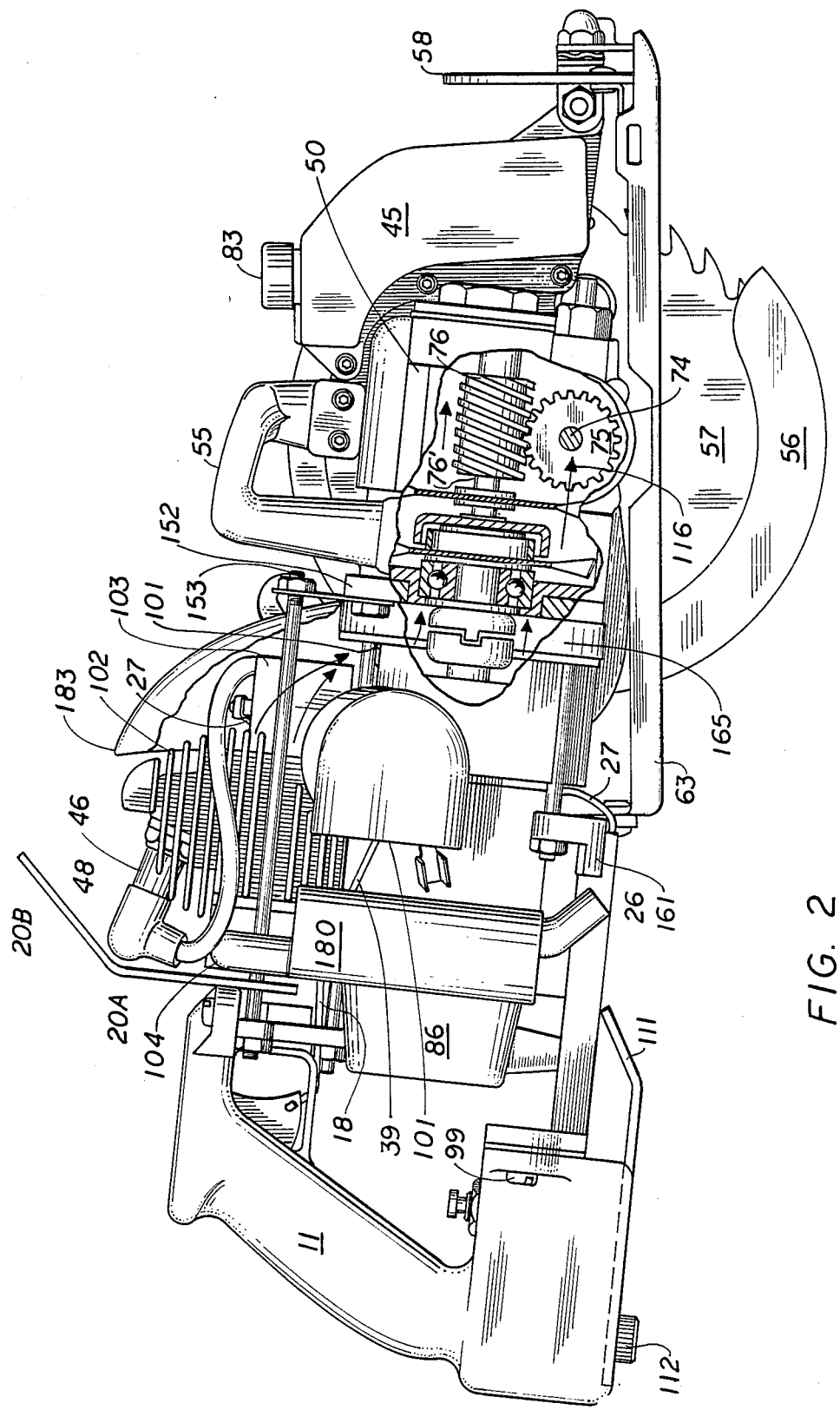
FIG. 2 is a vertical view, partly in section, of the opposite side of the one shown in FIG. 1, with the shroud and muffler removed for ease of illustration.
Figure 3:
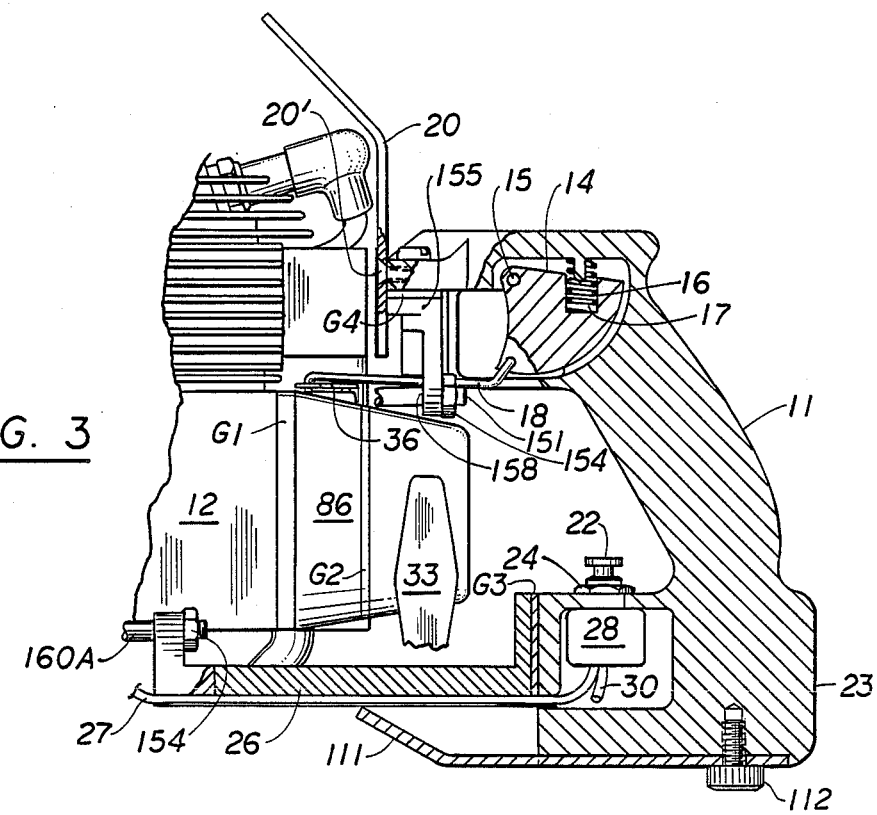
FIG. 3 is a partial cross-sectional view of the handgrip portion alone of the saw of FIG. 1.

A series of gaskets designated G2, G3 and G4 are suggested for use at the locations shown in FIGS. 1 & 2 to break the metal to metal contact; if metal is used on one or both sides of gaskets, and to therefore inhibit heat transfer rearwardly toward the hand of the operator. The actual assembly of the various components such as main housing 01 to engine 02 is by bolts into appropriate threaded bores.

A horizontally disposed threaded post 150 is secured in a suitable aperture 158 in the downward depending arm 156 of cross member 155 by nut 154 threaded to the first end 151 of said post 150. Per FIG. 6, the threaded second end 153 of post 150. is secured in a suitable aperture at the upper left corner of plate 152, which is disposed just behind clutch housing 06.

Figure 5:
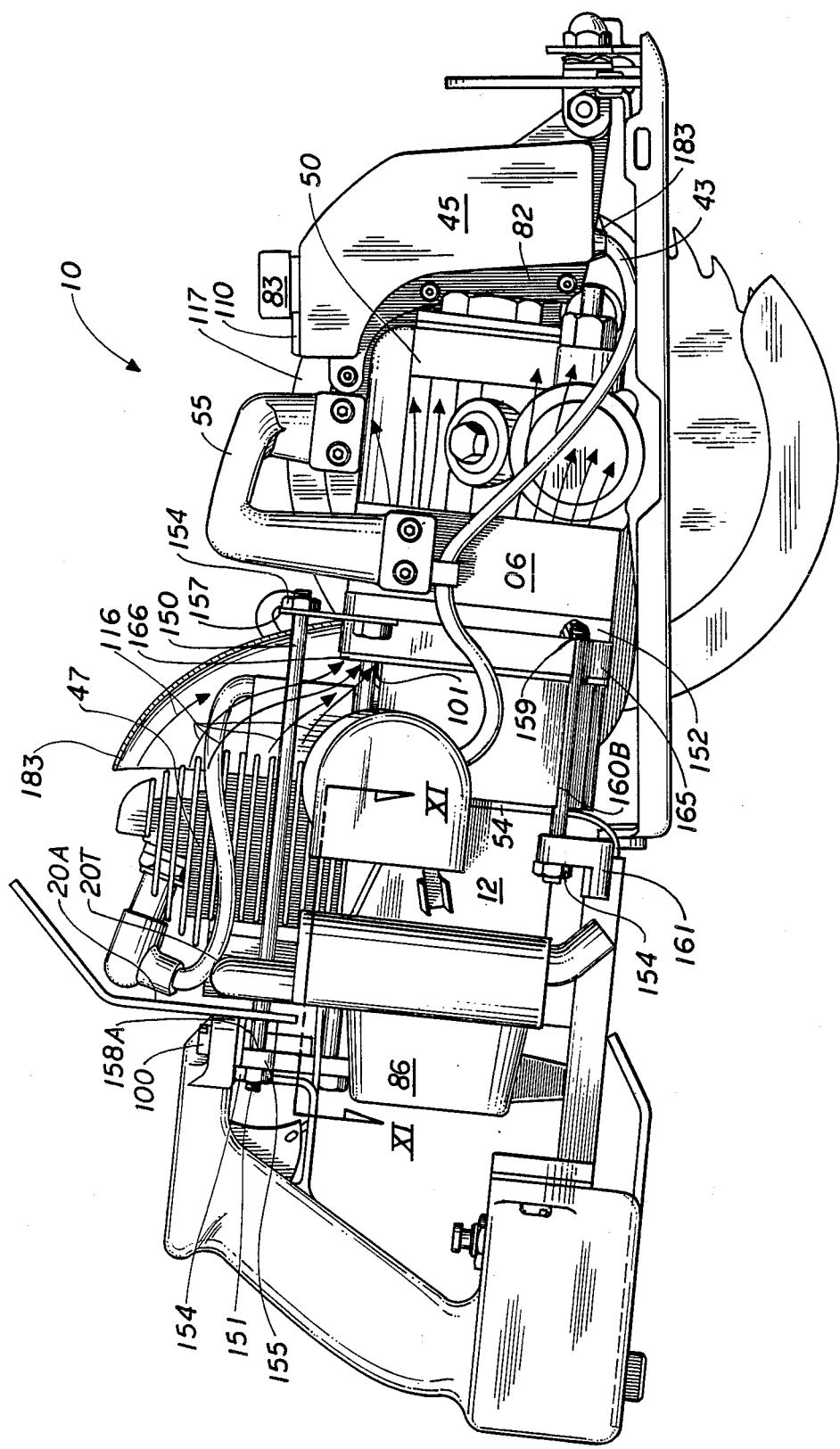
FIG. 5 is a vertical right side view taken along lines V—V of FIG. 4.

Reference should now be made to FIG. 5, the right side elevational view of device 10. Here a second post 150 is seen to be similarly disposed in an upstanding extension 157 of plate 152, with the threaded second end being retained by a nut 154. The first end 151 of the second post is disposed through a bore 20T in shield 20's vertical section 20A, and a suitable aperture 158A in cross member 155 and held therein by nut 154.

Plate 152 is retained in a rigid position by being affixed to clutch housing 06 by one of the aforementioned posts, 150, on the left hand side and by the bolt affixing extension 157 to plate 152 and two studs 160A, 160B disposed in bores 159 per FIG. 5.

Arc member 161 is retained in a rigid position by being affixed to studs 160A & 160B by nuts 154 (one on each side of arc member 161) FIG. 5. Studs 160A & B, which are threaded on each end and have a thickened portion to be between plate 152 and arc member 161, to allow tightening to secure arc member 161 by nuts 154A & 154B. The forward end of studs 160A, 160B are threadedly engaged in a bore at the lower end of plate 152 and secure 152 to 06.

Returning to FIG. 1, arc member 161 is secured to studs 160A and 160B secured into clutch housing 06 through bores in plate 152. Connector bracket 163 is secured to arc member 161 by a pair of allen screws 164. The connector bracket 163 also receives the large bolt 68 which controls movement of the saw sole plate 63.

It is seen therefore that handle 11 is totally isolated from the engine. This reduces vibration and fatigue in the hand of the user.

Disposed immediately rearwardly of plate 152 is a rubber separator 165 (see FIGS. 5 & 6) that serves to isolate the engine shock absorbing and suspend in place the engine from the clutch housing. This separator is bonded chemically using a suitable adhesive between the forward engine housing plate 166 per FIG. 9 and plate 152. Plate 152 is retained in this interposition by a series of bolts 160A & B that connect element 152 to clutch housing 06. One of the series of bolts 160A & B is seen in FIG. 8.

Figure 6:
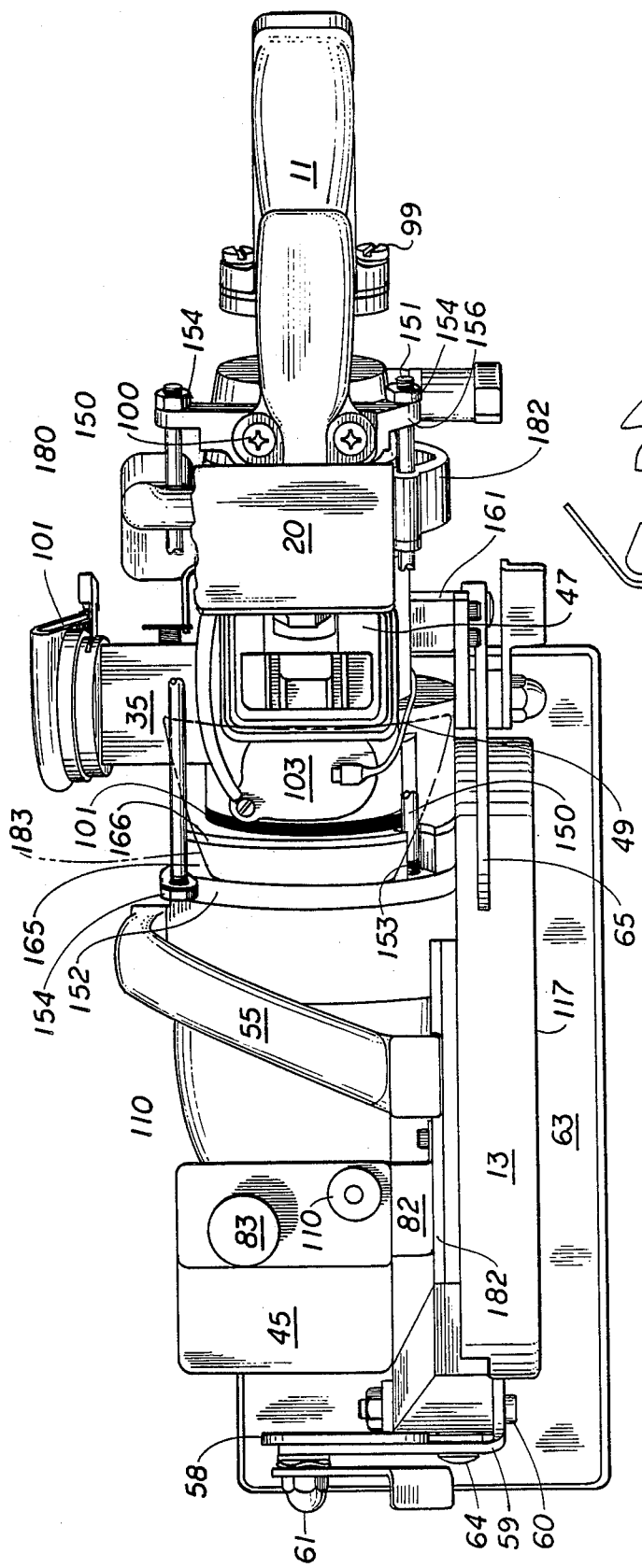
FIG. 6 is a top plan view of the saw of this invention.
Figure 10:
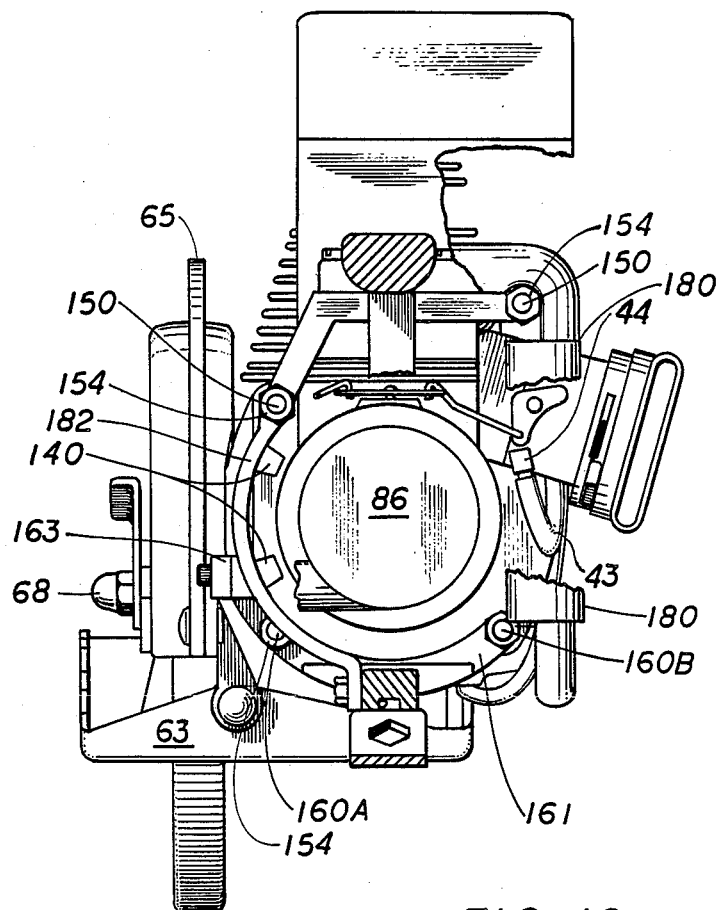
FIG. 10 is a view along lines X—X of FIG. 1 showing motor suspended and not coming in contact with anything other than rubber separator.
Figure 11:
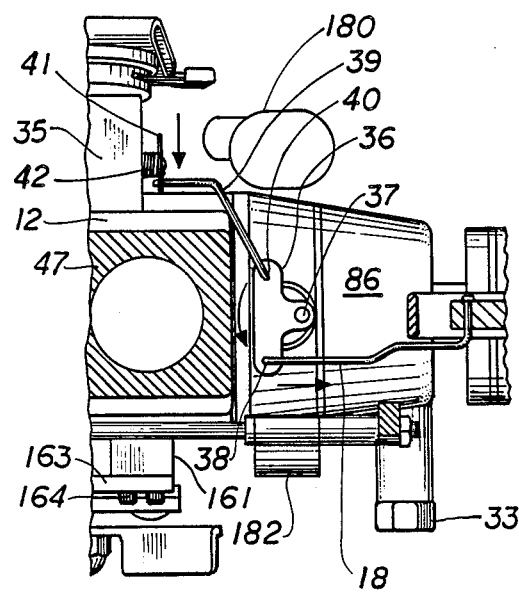
FIG. 11 is a sectional view taken along lines XI—XI in FIG. 5.

A conventional carburetor 35 is mounted in main engine housing 12 per FIGS. 6 and 11. In FIG. 11 rod 18 is coupled to a pivotally mounted lever 36 mounted centrally at pivot 37 at pivot 38. A rod 39 is pivotally mounted to lever 36 at pivot 40 and, at the other end, to a control lever 41 coupled to conventional carburetor mechanism 42. Fuel for carburetor 35 is provided by a fuel line 43 (see FIG. 5) coupled at one end to carburetor 35 via coupler 44 (see FIG. 10) and at the other end to a gas tank 45 mounted on sub-housing 50. A conventional spark plug 46 is mounted on main housing 12 in communication with a conventional internal combustion engine 47 in the interior of housing 12. A pull starter 33 is connected to the engine in conventional fashion and is used to start the engine which is well known in the art. Spark plug 46 is coupled to a spark plug cable 48 extending to the coil 103 which is mounted on main housing 12 which is in communication with an electrical conduit 49 extending to pull cord housing 86 containing ignition, points and condenser and in electrical communication with conduit 49 as shown in the Figures. However if an electronic ignition is employed conduit 49 can be omitted. A conventional connector 28 is attached thereto as is well known in the art. Further description thereof and how such apparatus operates is deemed unnecessary.

Figure 4:
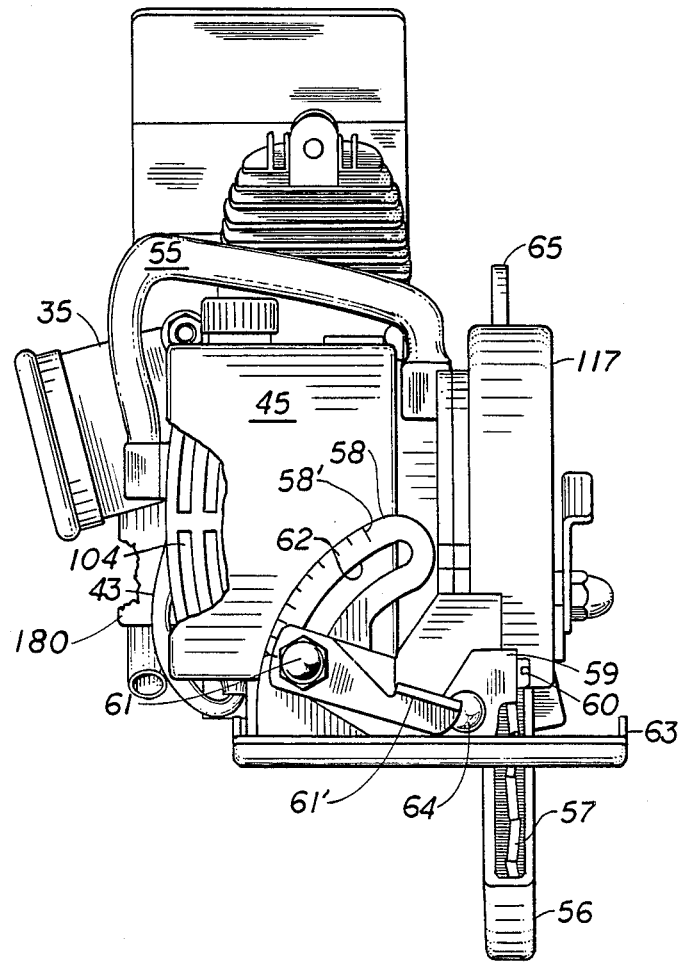
FIG. 4 is a front view taken along lines IV—IV of FIG. 1.

Circular saw blade housing 13 extends from and is coupled to sub-housing 50. A handle 55 is provided at the top of subhousing 50 (see FIGS. 1 & 2) and a movable saw blade guard 56 is coupled to saw housing 13 encircling the lower arcuate end of a circular saw blade 57. Handle 55, as seen in FIGS. 1 & 4, is angled to provide a good grip. An angle adjusting bracket 58 is mounted at the forward end of saw sole pate 63 and a fixed bracket 59 is mounted to saw housing 13 via screw 60. An adjusting lever 61' is retained by bolt 61, and is coupled to bracket 59. The bolt 61 extends through an arcuate slot 62 (FIG. 4) in bracket 58 so that adjustment of lever 61' changes the angularity of sole plate 63 relative to blade 57. Bracket 58 may be marked or scored with angle indicating indicia, 58'.

Blade 57, and its guard 56, extend through a rectangular sole plate 63 (see also FIG. 1) encircling saw blade 57. This sole plate 63 may be secured to bracket 59 via screw 64.

A second adjusting bracket 65 (FIGS. 1 & 10) having an arcuate slot 66 is mounted to connector 162 via screw 67. Adjusting bolt 68 extends through slot 66, with plate 69 thereon, to connector bracket 163 (see FIG. 10) on arc member 161 so that the orientation of sub-housing 50 can be adjusted with respect to sole plate 63.

Saw blade 57 is rotatably mounted on a transverse shaft (see shaft 74 in FIG. 1) having a nut 71 (FIG. 1) threaded thereto with a retainer 72 abutting against blade 57 as is well known in the art. Blade 57 is also keyed to the shaft 74 for rotation as is well known in the art and guard 56 includes suitable mechanism 73 for rotating it rearwardly or in a retracted position as is well known in the art.

Figure 9:
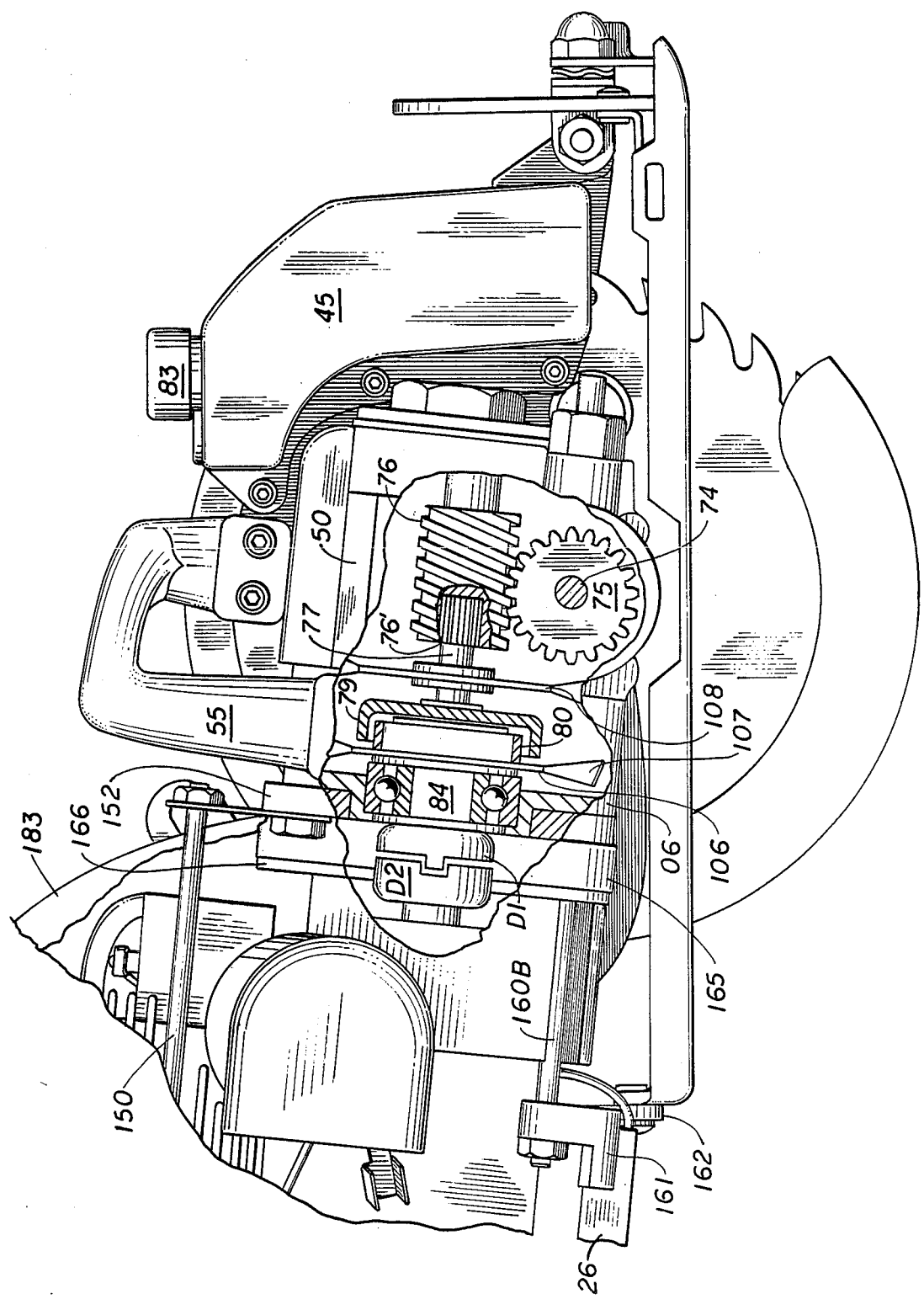
FIG. 9 is an enlarged view of the drive mechanism.

As seen in FIG. 9, a pinion gear 75 is fixedly secured to shaft 74 and in driving engagement with a worm gear 76. Worm gear 76 is fixedly secured to a shaft 77 splined at one end thereof (not shown), whereby the splined shaft fits into a splined recess 76' in the worm gear. The shaft 77 (see FIG. 9) at the other end engages a clutch housing 79 of a conventional centrifugal clutch 80 mounted internally of the clutch housing 06. A shaft 84 driven by engine 47 drives clutch 80. A fan 106 is built into clutch 80 and is disposed on shaft 84 rearward of clutch 80. See FIGS. 2 & 9. Also note the presence of fan 108 mounted on shaft 77. Fan 108 turns when the clutch 80 is engaged; while clutch 80 turns constantly when the engine is on thus fan 106 runs continuously. Again see FIG. 2 to note the forward air flow. Note that shaft 77 and the fan 108 and clutch housing 79 can be one integral unit.

A gas tank 45 per FIG. 5 is mounted on the right side of the saw housing 13 by a bracket 82, secured to plate 182 (FIG. 6) adjacent the saw blade shield 117. A filler cap 83 is provided on tank 45 for filling the tank with fuel. The tank is readily removable from said bracket as needed. Fuel is fed per FIG. 10 from tank per 45 by fuel line 43 from the tank bottom to the carburetor. Tank 45 may be of aluminum or any other suitable material and provided at the top with a conventional vacuum relief valve 110 (FIGS. 3 & 5).

The spark plug 46 is mounted to a fluted housing 102 mounted on the top of main engine housing 12. Conduit 27 leads to and is connected to ground at magneto coil 103 which is coupled to spark plug cable 48 and the engine (not shown) all as is well known in the art.

The air is taken into saw 10 via intake port 101 and flowing over fluted housing 102 exhausted out of exhaust ports 104 as seen in FIGS. 2 & 5. Exhaust ports 104 may be provided with a shroud. The path of the exhaust flow from intake 101 out exhaust ports 104 takes a down and forwardly right angle turn through fans 108 and 106 as indicated by arrows 116 in FIG. 5. An optional shroud may be employed. The exhaust from the motor exits out the rear right side, and passes through the spark arrester type muffler 180, to the right, downwardly and forwardly such as not to hit the operator's hand. The exhaust cools quickly.

Figure 7:
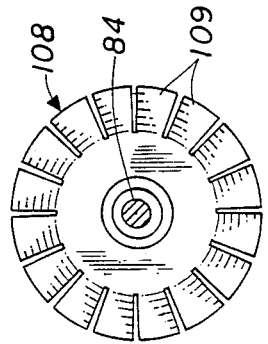
FIG. 7 is an elevational view of one of the components of the invention.

As seen in FIGS. 2 & 9, a fan 106 is fixedly secured to shaft 84 and keyed for rotation therewith. Fan 108, as seen in FIG. 7, has a plurality of fluted sections 109 formed by cutting out radially extending lines and bending the cut-out fluted sections 109. A similar fan 108 (FIGS. 2 and 12) is provided associated with clutch housing 79, also seen in FIG. 9, driven when clutch 80 is engaged and also having fluted sections 107 similarly formed to sections 109. Thus, fan 106 runs with clutch 80 and draws air in constantly when the engine is running. Fan 108 draws air in and runs only when the clutch 80 is engaged by revving of the motor. The angularity of sections 107 and 109 is such to blow air in the direction of arrows 116 (FIG. 5) out the exhaust ports 104. (See FIG. 4).

As seen in FIG. 1, a key or wrench 111 may be provided adapted to fit nut 71 (FIG. 2) and stored at the bottom of the lower portion 23 of handgrip 11 removably secured thereto by a knurled screw 112 extending through a hole in wrench 111 and threaded into a threaded hole 113 in lower portion 23. This wrench is used to remove the saw blade.

While the discussion has taken place primarily with respect to FIGS. 1 and 2, reference should also be made to FIG. 6, the top plan view for a clearer understanding of the location of the various components.

OPERATION

In operation, the operator grasps the saw 10 at handle 55 and handgrip 11. If desired, bolts 61 and 68 may be adjusted to change the angle and depth of cut of blade 57 as is well known in the art. Of course, gas tank 45 is filled via cap 83 with an appropriate mixture of fuel and oil, since the engine 47 is a two cycle engine.

Pull starter 33 is pulled to activate engine 47 as long as switch 22 is in the On position. Thus, trigger 14, which controls the carburetor 42 via lever 36, cannot be actuated unless the operator switches on toggle switch 22 and squeezes trigger 14.

Engine 47 rotates shaft 84 which in turn actuates clutch 80 and turns fan 106. Clutch 80 in turn engages clutch drum 79, shaft 77 and fan 108 with gear 76 in turn rotating gear 75 thus rotating saw blade 57 keyed thereto. Since clutch 80 is a centrifugal clutch, contact with clutch drum is broken when the clutch slows down as is well known in the art. Air is taken into saw 10 via intake port 101 and exhausted out of exhaust port 104.

Rubber separator 165 isolates vibrations between the motor housing and the blade 57 allowing more stable cuts. Heat shield 20 prevents heat from the motor 47 from passing to the handgrip 11. Tank 45 may be located at any suitable location on saw 10. Any suitable configuration and arrangement of handgrip 11 and trigger 14 and push button switch 22 may be used. Any suitable materials may be used, such as metals, plastics, rubber for separator 165, aluminum for heat shield 20, etc. Although subhousing 50 and saw blade housing 13 are shown as an integral unit, obviously such may be of separable parts. Actuating push button switch 22 quickly and easily stops engine 32. Hot air exhausts out of exhaust ports 104. A damper 165 may be provided as shown.

It can be seen that I have described a gas operated hand saw that can be used with a minimum of vibration, due to isolation of engine 47 from other mechanical components. If a preexisting electric saw is to be converted engine 47 operation according to this invention, the armature and field windings of a conventional electric saw may be removed and replaced by the parts herein described. The drive shaft of the conventional electric motor may be machined to receive the centrifugal clutch which shaft is then turned only when the engine or motor is accelerated. Thus, blade 57 does not turn while motor 32 is idling. The engine is suspended from rubber separator 165 by means of chemical bonding of rubber between main housing 01 and plate 152 therefore making plate 152, rubber separator 165 and housing 01 one piece. Connection between disc 01 and disc 02 is a loose fitting connection. This loose fitting connection is for the purpose of allowing engine and disc 02 to vibrate and still maintain vibration isolation from disc 01 and the saw 10. Any suitable rubber material or any other material having similar properties can be employed as separator 165. The saw 10 keeps cool due to rotating fans 106 and 108 since air flows forward away from the operator over the fluted housing 102. Wrench 111 is easily accessbble via knurled screw 112. The saw has a safety throttle switch 22 which can be actuated to kill the motor 32 immediately.

The saw described herein can be used in all carpentry and construction operations and is much safer than electric saws. It can be operated in all types of weather, such as rain and other wet conditions. Electric cords are eliminated, which cords can be carelessly cut by the operator resulting in serious injury. If a supply of electricity is not available at a particular job site, no portable generator is necessary with the saw herein. There are also no electrical components to burn out.

It is seen that by having the engine suspended, whereby it can vibrate freely, an isolation of vibration from the saw blade housing takes place, as well as from the plate handle and trigger.

Since the motor has no metal to metal contact other than at the two drive discs D1 and D2, vibration is minimized especially since the connection between D1 and D2 is specifically made loose.

It is further pointed out that the clutch housing as currently defined enables the clutch and clutch drive to remain concentric while allowing the motor to vibrate slightly, off center, along with disk D2.

Although I have described a particular embodiment of the invention, the scope of the invention is only limited by the description herein and the appended claims.

I claim:

1. In a self contained gas operated portable hand saw including
  a engine housing having a gas operated engine mounted therein and a engine shaft extending out of said housing driven by said engine, a carburetor mounted in said housing coupled to said engine, a handle mounted at one end spaced from said engine housing and a saw blade housing adapted to house therein a circular saw blade mounted at the other end of said engine housing, said saw housing being fixedly secured to and extending linearly from said engine housing and also having a handle thereon spaced from said first mentioned handle a distant sufficient for an operator to simultaneously grasp both of said handles when said engine is running and said engine shaft is rotating, a trigger provided on said first mentioned handle operatively connected to said carburetor for activating the same, a rotatable saw blade shaft extending transverse to said saw housing adapted to have said saw blade keyed thereto for rotation, a rotatable gear mounted in said saw housing having said rotatable saw blade shaft fixedly secured thereto, said gear rotating in a plane extending normal to the longitudinal axis of said hand saw whereby any saw blade keyed to said rotatable saw blade shaft rotates in a plane extending normal to the longitudinal extent of said hand saw, a worm gear in driving engagement with said saw blade shaft fixedly secured to a worm gear shaft extending toward said engine shaft, and centrifugal clutch means mounted in a clutch housing coupled to said engine housing between said worm gear shaft and said engine shaft driven by said engine shaft and engageable with said worm gear shaft when activated to thereby rotate said worm gear to rotate said blade shaft gear thereby rotating any saw blade keyed to said rotatable saw blade shaft, the improvement which comprises:
  said engine being suspended within said engine housing by vibration dampening means whereby said engine can vibrate freely with respect to said engine housing, and
  vibration isolating means coupled to both said first-mentioned handle and said engine housing for isolating vibration between said engine and said handle, and said saw blade housing.

2. In the saw of claim 1 wherein said vibration isolation means is a rubber separator mounted between the engine and the clutch housing.

3. In the saw of claim 2 wherein said rubber separator is bonded to said engine housing, the portion of said engine housing to which said separator is bonded being coupled to said clutch housing.

4. In the saw of claim 2 wherein said vibration isolation means includes a pair of spaced vertical plates mounted in said engine housing, said rubber separator being bonded between said spaced vertical plates, one of said plates being secured to said clutch housing.

5. In the saw of claim 1 wherein said vibration isolating means includes a cross-member coupling said first mentioned handle to said engine housing, said housing including a vertical plate spaced from said cross-member, said plate being coupled to both said clutch housing and said cross-member.

6. In the saw of claim 5 wherein said first-mentioned handle has an extension portion at the bottom thereof coupled to said vertical plate.

7. In the saw of claim 6 wherein said vibration isolation means is a rubber separator mounted between the engine and the clutch housing.

8. In the saw of claim 7 wherein said rubber separator is bonded to said engine housing, the portion of said engine housing to which said separator is bonded being coupled to said clutch housing.

9. In the saw of claim 7 wherein said vibration isolation means includes a second vertical plate spaced from the first-mentioned vertical plate mounted in said engine housing, said rubber separator being bonded between said spaced vertical plates.

10. In the saw of claim 9 including a first fan mounted on the engine shaft, operable when said engine is engaged, and a second fan is mounted on said worm gear shaft, and
  a centrifugal clutch, the housing of which is mounted in the worm gear shaft rearwardly of said second fan, the engaging portion of which is mounted forwardly of said first fan on the engine shaft, whereby said second fan turns only on engagement of said clutch,
  driving discs, disc 1 and disc 2 sufficient clearance is provided between driving surfaces of discs, disc 2 driver with clearance between disc 1 is attached to flywheel of engine, is allowed to vibrate freely with engine, while disc 1 remains concentric with clutch, clutch drum, and drive shaft to saw, thus allowing vibration to be further isolated from driving components, saw, and handles.

11. In the saw of claim 10 including a heat shield mounted between said housing and said handle for reducing the amount of heat from said engine to said handle.

12. In the saw of claim 10 wherein said trigger is pivotally mounted on said handle and includes a first link pivotally mounted thereto, an operating link pivotally mounted in said housing having the free end of said first link pivotally connected thereto at one end thereof, and a second link pivotally mounted to the other end of said operating link coupled to said carburetor for actuating the same.

13. In the saw of claim 10 including a second fan associated with said centrifugal clutch means and rotatable therewith.

14. In the saw of claim 10 including a saw blade nut wrench removably mounted to said handle.

15. In the saw of claim 10 wherein said second mentioned handle is angled laterally with respect to the central longitudinal axis of said saw.

16. In the saw of claim 10 further including a wrench to change saw blades secured to said handle, by wrench retention means.

* * * * *